Oct. 9, 1923.
F. KUSTERLE
1,470,015
CORNER FASTENING
Filed March 26, 1920
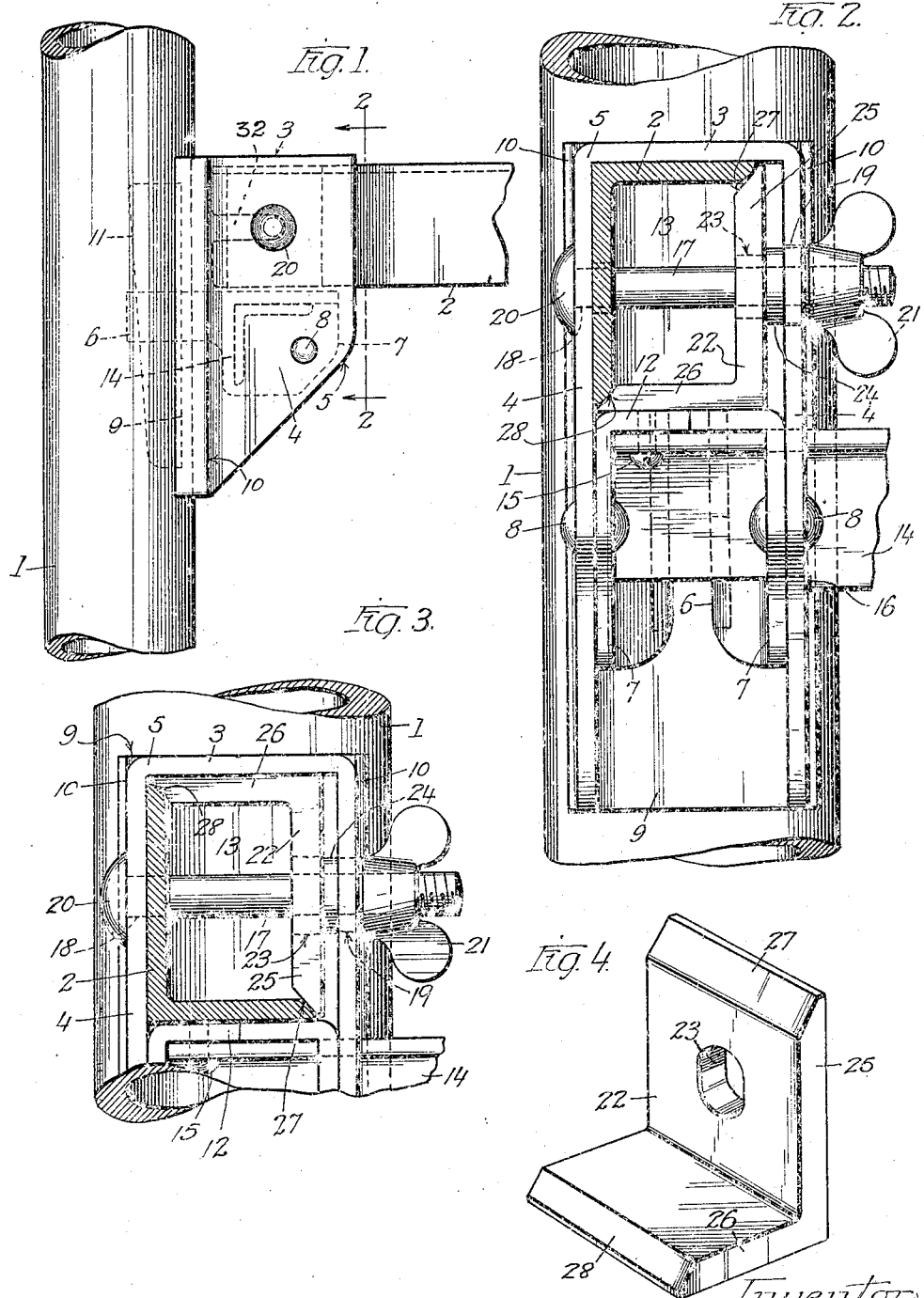
Inventor
Frank Kusterle
By Fisher, Fowle, Clapp & Soans Attys.

Patented Oct. 9, 1923.

1,470,015

UNITED STATES PATENT OFFICE.

FRANK KUSTERLE, OF KENOSHA, WISCONSIN, ASSIGNOR TO SIMMONS COMPANY, OF KENOSHA, WISCONSIN, A CORPORATION OF DELAWARE.

CORNER FASTENING.

Application filed March 26, 1920. Serial No. 369,053.

*To all whom it may concern:*

Be it known that I, FRANK KUSTERLE, a citizen of the United States, residing at Kenosha, in the county of Kenosha and State of Wisconsin, have invented certain new and useful Improvements in Corner Fastenings, of which the following is a specification.

My invention has reference more particularly to a device for detachably securing the end of a longitudinal member to another member or part and is particularly adapted for use in furniture construction, as for example, in beds wherein an angle iron side rail is connected to a post or bed-end.

The principal objects of my invention are to provide improved means for detachably securing the end of a longitudinal member of angular cross-section, such as an angle iron, in a socket; to enable said member to be readily secured in a socket in reversed positions; to retain the locking member assembled in place when the angle iron is released; to reduce the friction of the locking device so as to secure a tight clamping effect with a minimum of effort; and in general to provide improved locking means of this character which is simple and inexpensive and of compact form, and which may be conveniently and easily operated to securely clamp the end of an angle iron or similar member in a socket.

On the drawings, Fig. 1 is a side view of a fragmentary portion of a post with an angle iron secured endwise thereunto in accordance with my invention. Fig. 2 is an enlarged view of the structure shown in Fig. 1 taken on the line 2—2. Fig. 3 is a view similar to Fig. 2 showing the angle iron in the reversed position, and Fig. 4 is a perspective view of the locking block.

Referring to the drawings, the reference numeral 1 indicates a fragmentary portion of a post such as the post of a bed-end and 2 a fragmentary portion of an angle iron such as the angle iron side rail of a bed, which is detachably connected to the post 1.

For the purpose of such connection, the post 1 has a bracket or socket member indicated as a whole at 5, on the side thereof, which may be of any suitable form or construction and secured to the post in any desired manner. This socket, in the illustrated embodiment of my invention, comprises a plate bent in inverted U-shape to afford a top wall 3 and a pair of spaced depending legs 4. A looped strap 6 has enlarged ears 7 at each end, spread apart as shown, so as to engage against the inner surface of the legs 4 to which they are secured by rivets 8. The bight portion of the loop member 6 is contracted to a less width than the distance between the ears 7 and is inserted through an aperture provided therefor in the post 1. A block 9 conforming on its inner surface to the contour of the post 1 and provided on its outer surface with spaced marginal ribs 10 for engaging the legs 4 therebetween is interposed between the post 1 and the socket member 5, and both are securely clamped onto the post by a tapered pin 11, which is driven into the loop 6 at the inside of the post.

The ears 7 are located between the legs 4 at a distance from the top wall 3, as shown particularly in Fig. 2, and the upper extremities of the ears are bent inwardly as indicated at 12 so as to meet at a center line and form the bottom wall of the socket opening 13.

In bed construction, it is customary to provide a cross-brace or reinforcing member connecting the two posts of the bed and adjacent the point where the side rails are secured thereto, and in the present structure, I provide an angle iron 14 for this purpose. There is a socket member or bracket 5 on each post of the bed-end, and each end of the angle iron 14 is reduced to afford shoulders 16 and the reduced end secured to the respective socket member 5 in the following manner:

The leg 4 at the inner side of each socket member and the ear 7 attached thereto, is provided with an angular slot corresponding to the cross sectional form of the reduced end of the angle iron 14, and positioned so that said end may be inserted through the angular slot directly under and with one flange thereof engaged by the inturned portions 12 of the ears 7. The portion 12 farthest distant from the side of the socket through which the end of the angle iron 14 is inserted, is secured to the upper flange of the angle iron 14, by a cap screw 15 or other suitable fastening and this connection, together with the shoulders 16 of the angle iron 14 serves to tie together the two legs 4 of the socket in proper spaced relation.

Extending transversely through the socket 13, substantially midway between the top and bottom walls thereof, is a bolt 17 which is inserted through perforations 18 and 19 in the opposite walls 4 of the socket, the latter perforation being enlarged to admit the sleeve 24 which telescopes the bolt 17. The head 20 of the bolt engages against the exterior surface of one of the walls 4 and the opposite end of the bolt projects outside the socket member 5, and has a wing nut 21 threaded thereon, which through the interposed sleeve 24, serves to adjust the locking member 22. This locking member has a perforation 23 through which the bolt 17 passes, said perforation being elongated as shown to permit shifting of the locking member crosswise of the bolt.

The angle iron side rail 2 is preferably arranged so that it may be clamped in the socket 13 in reversed positions, one of which positions is illustrated in Fig. 2 and the other of which is illustrated in Fig. 3, and the block 22 is adapted to clamp the angle iron in the socket in either of these positions. The locking member 22 comprises two angularly related flanges 25 and 26 forming an angular block of substantially the same transverse form as the angle iron 2 and the upright flange 25 of this block has the edge beveled at 27 to engage the edge of the horizontal flange of the angle iron 2 in locking the angle iron in the socket, and the horizontal flange 26 has the edge beveled at 28 to engage the vertical flange of the angle iron, the inclination of the edge surfaces 27 and 28 being such as to jam the angle iron 2 corner-wise in the socket 13.

To enable the end of the angle iron 2 to be fully inserted in the socket 13 and pass the bolt 17, the upright flange of the angle iron is notched or slotted at 32, so as to straddle the bolt 17 as shown by dotted lines in Fig. 1.

In utilizing this lock, when the angle iron is to be inserted in the socket in the position shown in Fig. 2, the locking block 22 will be arranged with the flange 26 thereof at the bottom of the socket 13. By turning the wing nut 21 onto the bolt 17, the inner end of the sleeve 24 is caused to bear against the face of the block 22, forcing same over to the left (looking at Fig. 2), and the elongation of the opening 23 permits the block to automatically adjust itself according to the opposition encountered by the wedge surfaces 27 and 28. Both wedge surfaces 27 and 28 act upon their respective flanges of the angle iron 2 so as to jam the angle iron corner-wise in the socket 13 against the top wall 3 and the leg or wall 4 of the socket, and by reason of the pressure being applied to the edges of the flanges of the angle iron, both flanges are clamped tightly against the corresponding walls of the socket.

When the angle iron is clamped in the socket in the position shown in Fig. 3, the locking block 22 is first removed and reversed so that the flange 26 is at the top of the socket and the clamping action is then effected in a manner similar to that just described.

While I have shown and described my invention in a certain form, I am aware that various changes and modifications may be made without departing from the principles of my invention, the scope of which is to be determined by the appended claims:

I claim as my invention:

1. In a device of the class described, the combination of an angle iron and an end fastening therefor comprising a pair of abutments adapted to receive the angle iron cornerwise therebetween, a fixed member adjacent the abutment, and a locking member slidable on the fixed member transversely of the angle iron and having spaced bearings engaging the edges of the flanges of the angle iron, and threaded means for sliding the locking member along the fixed member to engage the bearings thereof against the edges of the flanges and thereby clamp the angle iron against the abutments.

2. In a device of the class described, the combination of an angle iron having a pair of angularly related flanges, a socket having a corner seat for the end of the angle iron, a locking member having angularly related flanges and means for clamping the edges of the flanges of the locking member against the edges of the flanges of the angle iron so as to clamp the angle iron in the corner seat of the socket.

3. In a corner fastening, the combination of an angle iron, a socket adapted to receive the end of the angle iron therein, a locking member comprising an upright portion, and a laterally projecting portion, each of which has a beveled extremity adapted to engage respectively with the outer edges of the two flanges of the angle iron, and means for applying pressure transversely of one of said portions for forcing said beveled extremities against the said edges of the angle iron to clamp the latter in the socket.

4. In a corner fastening, the combination of an angle iron, a socket adapted to receive the end of the angle iron therein, a locking member in the socket having an upright portion and a laterally projecting portion, each of which has a beveled extremity to engage respectively against the outer edge of each flange of the angle iron, and threaded means for applying pressure directly against the outer face of the upright portion of the locking member for shifting the latter transversely in the socket, and thereby clamping the angle iron in the socket.

5. In a corner fastening, the combination of an angle iron, a socket adapted to receive the end of the angle iron therein, a locking member loosely mounted to move bodily in a direction at right angles to one flange of the angle iron and having opposite beveled extremities adapted to engage respectively against the outer edges of each flange of the angle iron, and a threaded operating member for applying pressure to the locking member in a direction at right angles to the flange of the angle for forcing the beveled edges of the locking member against the edges of the angle iron, and thereby clamping the latter in the socket.

6. In a corner fastening, the combination of an angle iron, a socket adapted to receive the end of the angle iron therein, a bolt extending transversely through the socket, a locking member loosely mounted on the bolt and having the opposite extremities thereof beveled so as to wedgingly engage respectively against the edges of each flange of the angle iron, and a member having a threaded connection with the bolt and operable to force the locking member longitudinally of the bolt and thereby force the beveled edges thereof against the edges of the angle iron so as to clamp the latter in the socket.

7. In a corner fastening, the combination of an angle iron, a socket adapted to receive the end of the angle iron therein, a bolt extending transversely of the socket and having one end connected to a wall of the socket at one side of the angle iron, a locking member at the other side of the angle iron having the opposite extremities beveled and engaging against the opposite edges of the angle iron, and a member having a threaded connection with the bolt for forcing the locking member toward the wall of the socket to which the bolt is connected, and thereby clamping the angle iron in the socket by the engagement of the beveled edges of the locking member with the edges of the angle iron.

FRANK KUSTERLE.